US012590827B2

(12) United States Patent
Fuchs

(10) Patent No.:  US 12,590,827 B2
(45) Date of Patent:  Mar. 31, 2026

(54) POULTRY WEIGHING SCALE AND METHOD FOR THE GENDER-SPECIFIC WEIGHING OF POULTRY

(71) Applicant: BIG DUTCHMAN INTERNATIONAL GMBH, Vechta (DE)

(72) Inventor: Karsten Gerhard Fuchs, Essen (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 375 days.

(21) Appl. No.: 18/133,827

(22) Filed: Apr. 12, 2023

(65) Prior Publication Data

US 2023/0332940 A1 Oct. 19, 2023

(30) Foreign Application Priority Data

Apr. 14, 2022 (LU) ........................................ 102927

(51) Int. Cl.
G01G 17/08 (2006.01)
A01K 45/00 (2006.01)

(52) U.S. Cl.
CPC ............. G01G 17/08 (2013.01); A01K 45/00 (2013.01)

(58) Field of Classification Search
CPC ................................ G01G 17/08; A01K 45/00
See application file for complete search history.

(56) References Cited

U.S. PATENT DOCUMENTS

| | | | | |
|---|---|---|---|---|
| 5,438,960 A | * | 8/1995 | Roosenboom | ....... A01K 11/006 |
| | | | | 119/713 |
| 10,739,183 B2 | * | 8/2020 | Arbeau | ................. A01K 39/012 |
| 2009/0320761 A1 | * | 12/2009 | Grave | .................... G01G 17/08 |
| | | | | 119/51.02 |
| 2016/0231167 A1 | * | 8/2016 | Masin | ................. G06K 7/10386 |
| 2019/0391002 A1 | * | 12/2019 | Knight | .............. G06K 7/10366 |

FOREIGN PATENT DOCUMENTS

| | | | | | |
|---|---|---|---|---|---|
| EP | 0589534 | | 3/1994 | | |
| EP | 2133672 | | 12/2009 | | |
| FR | 2954890 A1 | * | 7/2011 | ............. | G01G 23/10 |
| FR | 3069922 A1 | * | 2/2019 | ............. | G01G 19/50 |

* cited by examiner

*Primary Examiner* — Natalie Huls
(74) *Attorney, Agent, or Firm* — PRICE HENEVELD LLP

(57) ABSTRACT

A poultry weighing scale for gender-specific weighing in poultry farming includes a weighing plate which is independently accessible for poultry, a weighing module, which is configured to detect the weight of one or more birds which are present on the weighing plate, and a poultry identification unit, which is configured to identify an individual or more birds and their gender of the birds which are present on the weighing plate. The weighing module and the poultry identification unit are configured and arranged as a functional unit of the poultry weighing scale. A method and use for the gender-specific weighing of poultry in poultry farming are also disclosed.

19 Claims, 5 Drawing Sheets

1000

| 1001 |
|:---:|

| 1002 |
|:---:|

| 1003 |
|:---:|

| 1004 |
|:---:|

| 1005 |
|:---:|

| 1006 |
|:---:|

| 1007 |
|:---:|

POULTRY WEIGHING SCALE AND METHOD FOR THE GENDER-SPECIFIC WEIGHING OF POULTRY

CROSS-REFERENCE TO FOREIGN PRIORITY APPLICATION

The present application claims the benefit under 35 U.S.C. §§ 119(b), 119(e), 120, and/or 365(c) and which claims priority to Application No. LU102927 filed Apr. 14, 2022.

FIELD OF THE INVENTION

The invention relates to a poultry weighing scale for gender-specific weighing in poultry farming, to a method for the gender-specific weighing of poultry in poultry farming, and to the employment of a poultry weighing scale.

BACKGROUND OF THE INVENTION

EP 2133672B1 describes a poultry weighing scale configured with force sensors and an evaluation unit, for the saving of variation in the weight force applied by poultry which are present on the contact surface without gender-specific assessment.

In poultry farming, weighing of the livestock is important for the gender-specific assessment and monitoring of their growth, sexual development, animal welfare, and other parameters which are relevant to the breeding and farming of poultry. However, the weighing of poultry in the stall is a manpower-, labour-, and time-intensive operation.

SUMMARY OF THE INVENTION

One object of the present invention is therefore the provision of a poultry weighing scale for gender-specific weighing in poultry farming, a method for the gender-specific weighing of poultry in poultry farming, and an employment of a poultry weighing scale which reduce or eliminate the mentioned disadvantages. In particular, one object of the present invention is the provision of a poultry weighing scale for gender-specific weighing in poultry farming, a method for the gender-specific weighing of poultry in poultry farming, and an employment of a poultry weighing scale which represent a simplified and/or cost-saving and/or reliable solution.

According to the invention, this object is achieved by a poultry weighing scale for gender-specific weighing in poultry farming, comprising a weighing plate which is independently accessible for poultry, a weighing module which is configured to detect the weight of one or more birds which are present on the weighing plate, and a poultry identification unit which is configured to identify an individual or more birds and their gender of the birds which are present on the weighing plate, wherein the weighing module and the poultry identification unit are configured and arranged as a functional unit of the poultry weighing scale.

The invention is based, inter alia, on the knowledge that, in poultry farming, particularly in poultry farming, such as, for example, in egg hatching production, in which roosters and hens are kept together, gender-specific weighing is important. In the present context, by the term gender-specific weighing, it is particularly understood that, in addition to the weight, the gender of poultry is determined and, preferably, is also considered in further evaluation. For example, the age-related weight of roosters generally increases at a faster rate than the weight of hens, i.e., roosters are heavier than hens. Poultry breeding businesses, for example, supply weight curves with standard weight-related target weights for various breeds of poultry. The application of the solution described herein is particularly advantageous for poultry in the age range of 16 to 62 weeks. During this time period, poultry gain approximately 30 to 70 g per week, for example. The poultry weighing scale is preferably configured to detect weights within the range of 0.5 to 15 kg, particularly weights of at least 0.8 kg and/or of no more than 10 kg.

By means of the solution proposed herein, it becomes possible to detect the weight of a bird, and to associate this weight with gender information for said bird. This has the advantage that, over existing solutions, in which it is necessary for gender information to be determined manually or otherwise separately, in the present case, by means of the poultry weighing scale, which can be deployed as required in a poultry stall for the weighing of a population, the weight information and the gender information for poultry can be detected.

The weight detection leads to weight information on the poultry, and the gender detection leads to gender information on the poultry. For each bird, weight information and gender information are determined here. Within the population of poultry in a poultry stall, a plurality of weight information and gender information are then determined. These can comprise weight information and gender information for all poultry in a population, or weight information and gender information for only a proportion of the poultry. Weight information which is associated with gender information can also be described as gender-specific weight information. This term can describe weight information which, additionally to an indication of weight, also obtains an indication of gender.

As the poultry weighing scale proposed herein is preferably portable, it can be deployed in a poultry stall, the population of which is to be weighed. The weighing plate is preferably arranged such that poultry, independently and on their own initiative, preferably with no substantial inhibition threshold, can access the weighing plate. The poultry weighing scale can thus be set up in the poultry stall at one location—or at a plurality of locations in succession, or simultaneously, with multiple poultry weighing scales. In the context of their natural movements within the stall area, the poultry will also move onto the weighing plate and, as soon as a bird is present on the weighing plate, a measuring process is triggered, wherein weight information and gender information are determined.

To this end, the poultry weighing scale not only comprises a weighing module, which is configured to detect the weight of a bird which is present on the weighing plate, but also a poultry identification unit, which is configured to detect a gender of a bird which is present on the weighing plate. By the functional arrangement of these elements as part of the poultry weighing scale, a comprehensive solution is provided. In this manner, the requisite manpower can be significantly reduced, as the poultry enter the poultry weighing scale in an independent manner, and the gender information is automatically concomitantly determined, without the necessity for a manual or separate process for this purpose.

The poultry weighing scale further comprises a poultry identification unit, which is configured to identify an individual or more birds present on the weighing plate, and the gender thereof, to detect the obtained group weight and gender information, and to evaluate same according to a single- or mixed-gender group.

A configuration and arrangement in the form of a functional unit can be embodied, for example, by configuration and arrangement within a housing.

In order to detect weight information and gender information for the greatest possible number of poultry, it is preferable to position the poultry weighing scale within a poultry stall such that the poultry weighing scale, insofar as possible, is located in a region which is highly frequented by large numbers of poultry.

By the determination of weight information and gender information, it becomes possible for gender-specific weight information to be inferred and compared, for example, with gender-specific weight curves or other target values. According to the result of this comparison, the quantity and/or type of feed can then be adjusted, particularly in a likewise gender-specific manner, since, in general, the feeding in poultry farming is also executed separately according to gender. This is particularly advantageous in the light of rising feed prices, on the grounds that feeding can thus be undertaken in the most needs-based and animal-friendly manner possible.

According to a preferred embodiment, it is provided that the poultry identification unit comprises an image detection unit. An image detection unit can be provided, by means of which the gender of a bird which is present on the weighing plate can be detected. This has the advantage that no fitting of elements, such as RFID tags to poultry, is required. Notwithstanding, it is commonplace for a person skilled in the art to detect the gender of the animal by reference to the corresponding RFID tags and RFID readers. The nature of the specific detection of the individual gender does not restrict the scope of the invention.

It is preferably provided that the image detection unit comprises a camera and an image evaluation unit.

It is further preferred that the camera is arranged to detect the number of one or more poultry which are present on the weighing plate. In order to unambiguously and accurately assign weight and gender, it is preferred that, in the event of multiple poultry on the weighing plate, only such weighing operations which have identified single-gender groups is subject to further processing. Mixed-gender weighing operations are preferably used separately, or are discarded.

It is further preferred that the camera is arranged to detect a bird which is present on the weighing plate, particularly the head region of a bird which is present on the weighing plate. It is further preferred that the image evaluation unit is configured, by reference to image data, particularly image data of the head region of a bird, to determine the gender of the bird.

This embodiment is based on the knowledge that gender-specific, particularly different phenotypic head features of rooster and hen such as, for example, by reference to wattles, bills, and/or size, can be effectively captured by means of image detection and evaluation, particularly in poultry of an age ranging from 16 to 62 weeks.

In a preferred embodiment, it is provided that the weighing module is configured to form gender-specific mean values for a plurality of weight information and/or gender information. In this case, preferably, the weight information which has identical or matching gender information are added together and divided by the number of poultry for which the weight information has been sourced.

A further preferred further development is characterized by a memory unit, wherein the memory unit is preferably arranged within the poultry weighing scale, and/or wherein the memory unit is preferably configured to store weight and/or gender of poultry and/or gender-specific mean values for a plurality of weight information and/or gender information.

In a further preferred further development, it is provided that the weighing module is configured to compare a weight, particularly a weight-specific weight, and/or a gender and/or gender-specific mean values for a plurality of weight information with at least one weight curve, preferably at least two gender-specific weight curves, wherein weight information, particularly gender-specific weight information, which deviates from a weight curve by a preferably predefined value, is preferably stored separately and/or is not considered for the forming of mean values. Deviating measurements of this type may be, for example, incorrect measurements which may result for instance from the fact that multiple birds are kept on the weighing plate.

In a further preferred further development, it is provided that the at least one weight curve, preferably the at least two gender-specific weight curves is/are stored in the memory unit and/or in the weighing module, and/or is characterized in that one weight curve, preferably all the weight curves, contains/contain data on the target weight and/or target weight range in relation to the age of poultry.

Accordingly, in this embodiment, the further processing of the detected weight information is preferably executed dependently on whether the gender-specific weight information lies within a, preferably predefined, bandwidth about a likewise gender-specific weight curve. Preferably, gender-specific weight information which lies within a, preferably predefined, bandwidth about a likewise gender-specific weight curve is employed for the forming of gender-specific mean values. In this manner, preferably within a poultry stall population, mean values for weight information can be determined separately for roosters and hens. On the grounds that, preferably, that weight information which deviates from the weight curves by a, preferably predefined, value and/or which lies outside a, preferably predefined, bandwidth about the weight curves is stored separately and/or is not used for the forming of mean values, the quality and validity of the gender-specific mean values is enhanced.

It is preferably provided that supplementary data to the weight information and/or gender information and/or gender-specific mean values are stored in the memory unit, wherein the supplementary data preferably comprise time information, for example in the form of a time stamp and/or geographical information and/or environmental information.

The processing of the weight information and/or gender information and/or the forming of gender-specific mean values can be executed entirely or partially in the poultry weighing scale, preferably in one or more of the components thereof described herein, or entirely or partially in a computing unit, which can be part of a separate computer, network, and/or cloud. A connection of the poultry weighing scale to a computing unit of this type can preferably be configured in a hard-wired or a wireless manner.

A preferred further development is distinguished in that the poultry weighing scale comprises a data interface, wherein the data interface is preferably configured to transmit data which are stored in the memory unit. The data transmission can preferably be configured in a hard-wired or a wireless manner.

In a preferred embodiment, it is provided that the weighing plate is mounted above at least or exactly one weighing cell, wherein the at least or exactly one weighing cell is preferably arranged within the poultry weighing scale, and/or wherein the at least or exactly one weighing cell is preferably part of the weighing module.

It is further preferred that the poultry weighing scale comprises stainless steel, or is composed of the latter, and/or is characterized in that the poultry weighing scale comprises stainless steel and plastic, or is composed of the latter. Moreover, it is preferably provided that the poultry weighing scale is configured with a splash-proof and/or watertight design.

The arrangement of various components within the poultry weighing scale has the advantage of a compact and portable arrangement, and simultaneously also has the advantage of the protection of the components against environmental influences, particularly to protect against the corrosive conditions in a poultry stall. The splash-proof and/or watertight configuration has the advantage that the poultry weighing scale can be cleaned, e.g., using a pressure washer. This is also particularly significant, as the portable poultry weighing scale can be employed in various stalls and, upon the transfer from one stall to another, it is intended that no transfer of soiling and/or of pathogens should occur.

For a configuration of this kind for the poultry weighing scale and the arrangement of the components therein, a configuration is particularly also preferred in which caching of data is executed in the poultry weighing scale, and to transmit the cached data via the data interface by way of a terminal of the poultry weighing scale, preferably to transmit same in a wireless arrangement, which is preferred in the case of a closed, splash-proof, and/or watertight configuration of the poultry weighing scale.

Moreover, it is preferably provided that the poultry weighing scale is configured with a mobile design, and preferably comprises an undercarriage, for example rollers and/or chains and/or runners, wherein the undercarriage is preferably arranged such that the poultry weighing scale can be tilted and moved on the undercarriage. It is particularly preferred here that the poultry weighing scale comprises a handlebar and/or a handle and/or a location aid.

A mobile and/or portable configuration, particularly having a handlebar and/or a handle and/or a location aid, facilitates the movement of the poultry weighing scale from one site of use to the other. A configuration, preferably in the form of a trolley, has the advantage of simple and uncomplicated mobility and retrievability, particularly even in a poultry stall. A location aid can be configured, for example, optically and/or acoustically and/or by way of signalling. The location aid can comprise, for example, a, preferably upwardly oriented, bar, optionally comprising a clearly visible marking element and/or comprising a light and/or acoustic signal generator. The handlebar and/or the handle can also function as a location aid. The location aid is advantageous, as a poultry weighing scale which is deployed can potentially be extremely difficult to retrieve in a poultry stall containing poultry, as the latter can be covered by large numbers of poultry. The location aid can here facilitate the location of the poultry weighing scale.

A further preferred further development is distinguished in that the poultry weighing scale comprises enticements, e.g., food, water, or lighting means, in order to enhance the attractiveness of the poultry weighing scale, particularly the weighing plate, for poultry. As the quality and validity of the gender-specific mean values increases with the number of poultry weighed, an enhancement of attractiveness can be advantageous, in order to weigh the largest possible number of poultry.

According to a further aspect of the invention, the object mentioned at the outset is achieved by a method for the gender-specific weighing of poultry in poultry farming, comprising: deployment of a portable poultry weighing scale, particularly an above-described portable poultry weighing scale, in a poultry stall, detection of the weight of a bird, particularly of a bird which is present on the weighing plate, detection of the gender of a bird which is present on the weighing plate.

The method is preferably further developed by: saving of weight information and/or gender information and/or images, and preferably saving of gender-specific mean values for a plurality of weight information and/or gender information, and/or providing and preferably saving the weight information and/or gender information and/or gender-specific mean values with supplementary data, preferably comprising time information, for example in the form of a time stamp, and/or geographical information and/or environmental information, and/or transmission of weight information, and/or gender information and/or gender-specific mean values, and preferably of supplementary data, and/or comparison of weight information and/or gender information and/or gender-specific mean values with at least one weight curve, preferably at least two gender-specific weight curves.

According to a further aspect of the invention, the object mentioned at the outset is achieved by the employment of a poultry weighing scale according to the invention for the gender-specific weighing of poultry in poultry farming, particularly in a method according to the invention.

With respect to the advantages, preferred embodiments and details of the individual aspects, and the preferred embodiments thereof, reference is also made to the corresponding advantages, preferred embodiments, and details which are described with reference to the respectively other aspects.

Further advantageous variants of embodiment of the above-described poultry weighing scale and/or of the above-described method emerge from the combination of individual, a plurality, or all the preferred features described herein.

BRIEF DESCRIPTION OF THE DRAWINGS

Preferred exemplary embodiments are described, for exemplary purposes, with reference to the attached figures. In the figures.

DETAILED DESCRIPTION OF THE EMBODIMENTS

Figure 1:
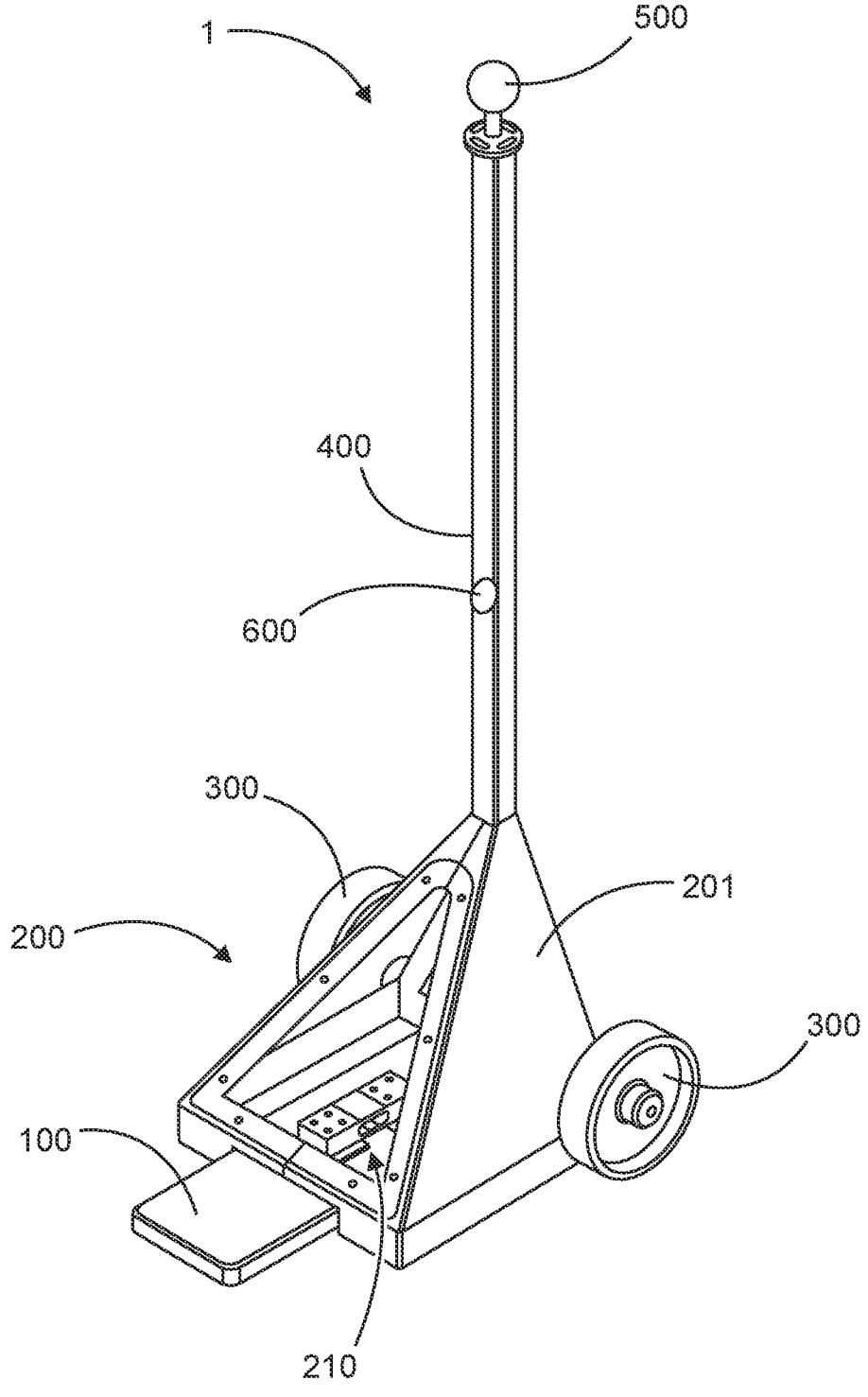
FIG. 1 shows a three-dimensional representation of an exemplary portable poultry weighing scale.
Figure 2:
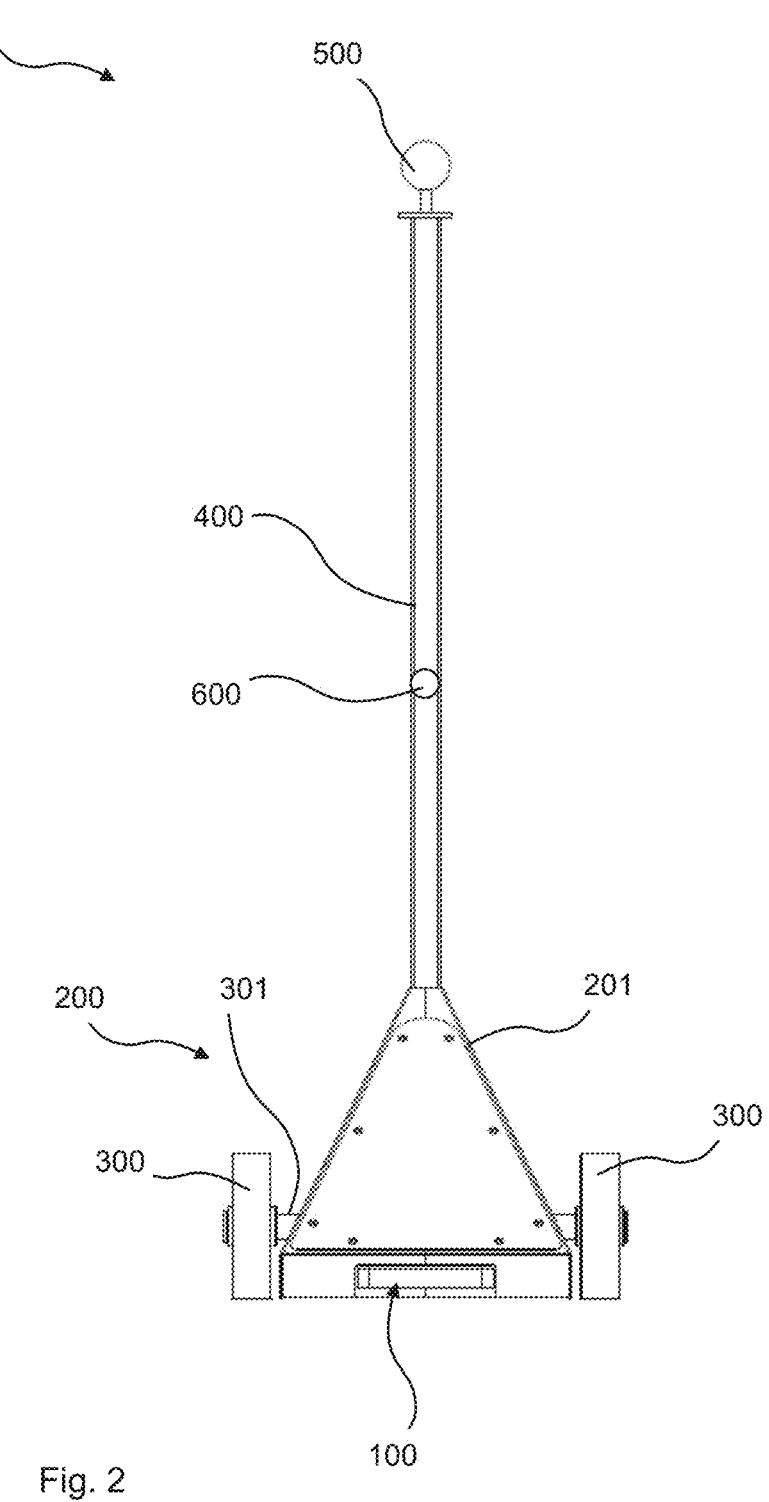
FIG. 2 shows a front view of the movable poultry weighing scale according to FIG. 1.
Figure 3:
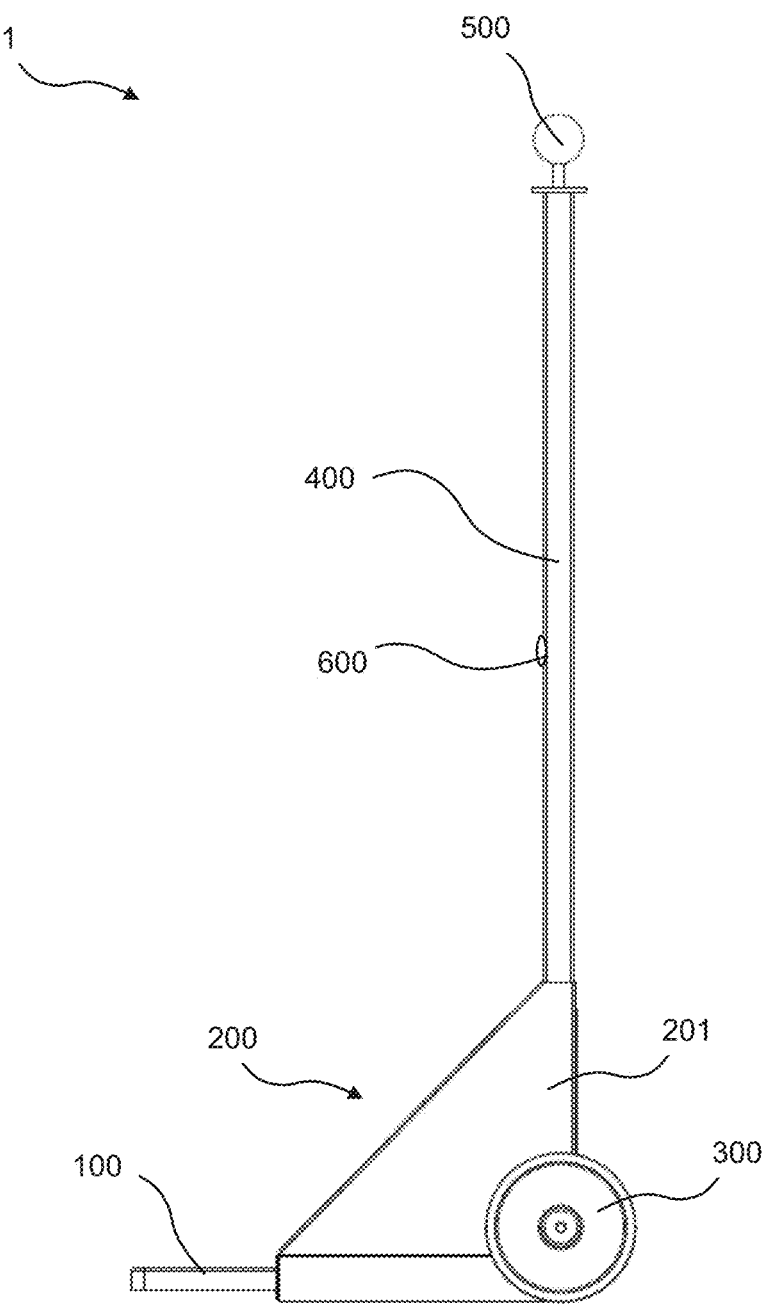
FIG. 3 shows a side view of the movable poultry weighing scale according to FIG. 1.
Figure 4:
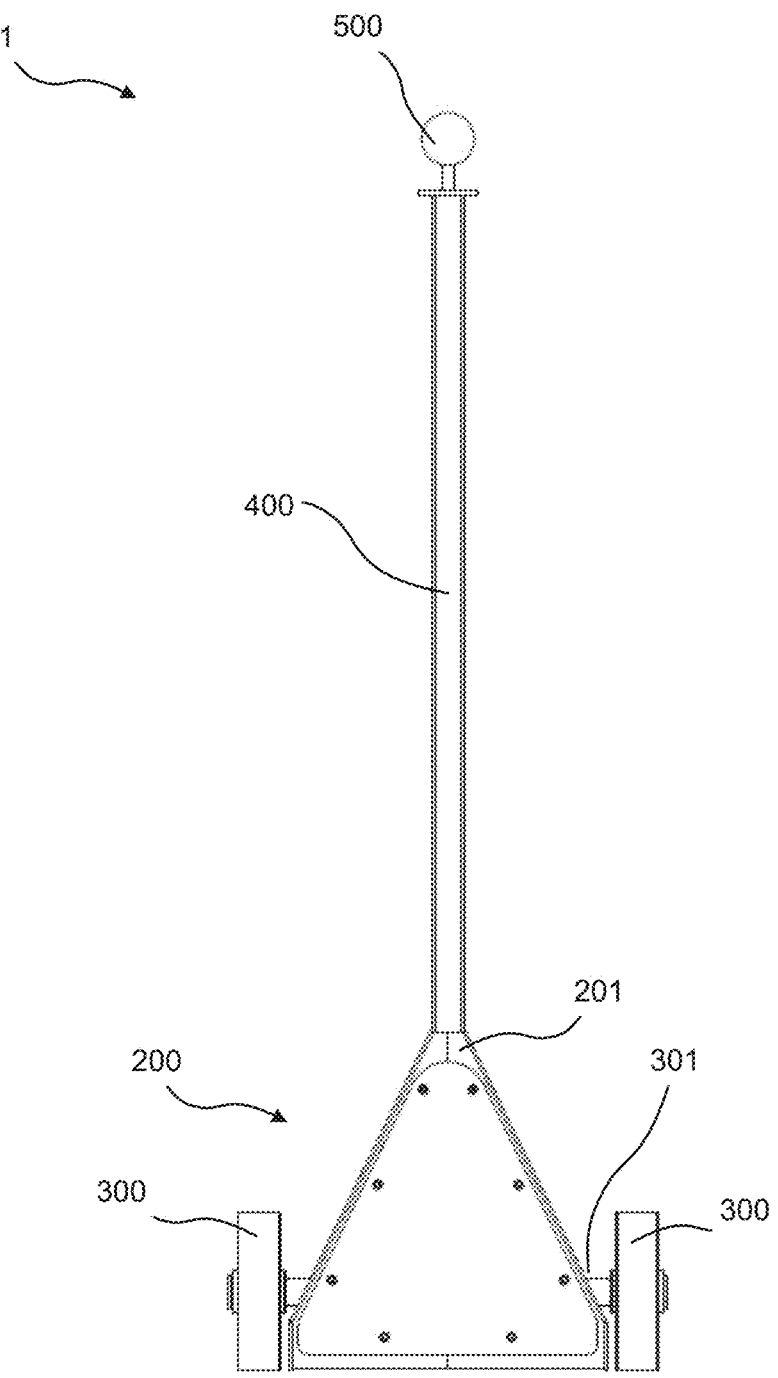
FIG. 4 shows a rear view of the movable poultry weighing scale according to FIG. 1.

In the Figures, identical or essentially functionally identical elements are provided with the same reference numbers. General descriptions, in general, refer to all embodiments, unless distinctions are explicitly indicated.

FIGS. 1 to 4 show an exemplary portable poultry weighing scale 1. The poultry weighing scale 1 is employed for gender-specific weighing in mixed-gender poultry farming, and is portably configured, such that the poultry weighing scale 1 can be employed in various poultry stalls, and at various locations within a poultry stall.

In particular, the poultry weighing scale 1 is configured with a portable design. The term portable is preferably referred to as a poultry weighing scale 1, having such a weight and having such dimensions that the poultry weighing scale 1 can be moved, particularly carried, by one to two persons, particularly by a single person.

In the example represented here, the poultry weighing scale 1 is configured with a mobile design, and comprises an undercarriage with rollers 300 which are mounted above a roller axle 301. The undercarriage is arranged such that the poultry weighing scale 1 can be tilted and moved on the undercarriage, for example a trolley. To this end, the poultry weighing scale 1 can be held on the handle 500 fastened to the handlebar 400, tilted and pulled behind a person, thus providing particularly simple mobility for the poultry weighing scale 1.

The poultry weighing scale 1 comprises a weighing plate 100 which is independently accessible by poultry. The weighing plate 100 is preferably the only functional element which, particularly in proximity to the ground, is not arranged in the housing 200.

The poultry weighing scale 1 comprises a plurality of side walls 201, which are preferably formed or composed of stainless steel, or are formed or composed of stainless steel and plastic. Overall, the poultry weighing scale 1 is configured such that it comprises stainless steel or is composed thereof, and/or comprises stainless steel and plastic or is composed thereof. In particular, the poultry weighing scale 1 is preferably configured with a splash-proof and/or watertight design.

In this case, the handlebar 400 and the handle 500 are understood as functional elements which are arranged in the poultry weighing scale, and preferably also comprise stainless steel or are composed thereof, and/or comprise stainless steel and plastic or are composed thereof. Moreover, the handlebar 400 and the handle 500 are preferably also configured with a splash-proof and/or watertight design. Moreover, further elements such as, for example, apparatuses for the accommodation of cameras or similar, can be arranged on the handlebar 400 and/or the handle 500.

The poultry weighing scale 1, in its interior, preferably comprises all the functional elements, other than the weighing plate 100. These functional elements which are arranged in the poultry weighing scale 1 can also be referred to as components 210. The components 210 preferably comprise a weighing module and a poultry identification unit. The weighing module is configured to detect the weight of a bird which is present on the weighing plate 100. The poultry identification unit is configured to detect a gender of a bird which is present on the weighing plate. The poultry identification unit can preferably comprise an image detection unit which, in turn, can preferably comprise a camera and an image evaluation unit. The camera can preferably be arranged at a distance from the image evaluation unit and/or is preferably arranged to be able to detect poultry present on the weighing plate 100, particularly the head region thereof. For example, a camera 600 can be arranged on the handlebar 400 and/or the handle 500.

As functional elements, the components 210, particularly the weighing module and the poultry identification unit, are arranged within the poultry weighing scale 1.

The weighing plate 100 is preferably mounted above at least or exactly one weighing cell. The at least or exactly one weighing cell is preferably arranged within the poultry weighing scale 1, and can preferably be part of the weighing module. A further component 210 can be a memory unit.

The operating mode of a poultry weighing scale 1 of this type also becomes particularly clear by the following description of an exemplary method 1000 for weighing poultry in poultry farming.

Figure 5:
FIG. 5 shows a schematic flow diagram of an exemplary method for weighing poultry.
Figure 5:
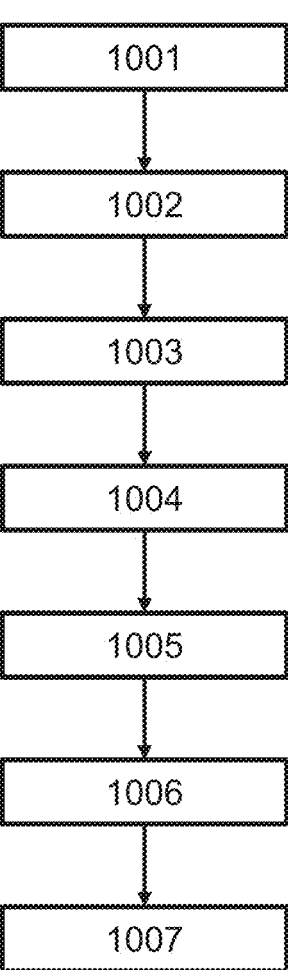

FIG. 5 shows a schematic flow diagram of an exemplary method 1000 for weighing poultry in poultry farming. Herein, in a first step 1001, a portable poultry weighing scale, particularly an above-described portable poultry weighing scale 1, is deployed in a poultry stall. If a bird is present on the weighing plate 100, in a further step 1002, the weight of the bird is detected and, in step 1003, the gender of the bird is detected. These steps 1002 and 1003 can preferably be executed in parallel and/or simultaneously. In step 1004, the weight detected and the gender detected are stored in the form of weight information or gender information. Steps 1002 to 1004 are preferably repeated, as soon as a bird has departed the weighing plate 100 and a new bird is present on the weighing plate 100.

In step 1005, the weight information and/or gender information are preferably compared with at least one weight curve, preferably at least two gender-specific weight curves. Here, in an advantageous manner, three groups of weight information can be formed: a first group of weight information for a first gender, a second group of weight information for a second gender, and a third group of weight information, which can be assigned to neither the first nor the second gender, for example on the grounds that it deviates from a weight curve and/or a target weight and/or a target weight range by a, preferably predefined, value, or range.

In step 1006, gender-specific mean values for a plurality of previously captured or detected, and preferably stored weight information are formed, and preferably also stored. Preferably, for the first group of weight information, a mean value is formed for the first gender and, for the second group of weight information, a mean value is formed for the second gender. The third group of weight information can undergo a separate evaluation in which, for example, can be investigated for reasons for, or indications of, the deviating values.

In step 1007, preferably cached weight information and/or gender information and/or gender-specific mean values, and preferably of supplementary data, are transmitted previously, preferably via a data interface. The transmission is preferably executed in a non-wireless manner, for example in a hard-wired arrangement and/or via a docking station and/or the interchange of a memory unit.

The invention claimed is:

1. A poultry weighing scale for the gender-specific weighing in poultry farming, comprising:

a weighing plate which is independently accessible by poultry;

a weighing module, which is configured to detect the weight of one or more birds which are present on the weighing plate; and a poultry identification unit, which is configured to identify an individual or more birds, and the gender of the birds which are present on the weighing plate;

wherein the weighing module and the poultry identification unit are configured and arranged as a functional unit of the poultry weighing scale; and wherein the poultry weighing scale is configured with a mobile design, and further comprises an undercarriage arranged such that the poultry weighing scale can be moved on the undercarriage.

2. The poultry weighing scale according to claim 1, wherein the poultry identification unit comprises an image detection unit.

3. The poultry weighing scale according to claim 2, wherein the image detection unit comprises a camera and an image evaluation unit, and wherein the camera is arranged to detect a bird which is present on the weighing plate, by reference to image data, to determine the gender of the bird.

4. The poultry weighing scale according to claim 3, wherein the camera is arranged to detect the head region of a bird which is present on the weighing plate and wherein the image evaluation unit is configured to refer to image data of the head region of a bird to determine the gender of the bird.

5. The poultry weighing scale according to claim 1, wherein the weighing module is configured to form gender-specific mean values of a plurality of weight information and/or gender information.

6. The poultry weighing scale according to claim 5, wherein the weighing module is configured to compare a weight, a gender, or gender-specific mean values for a plurality of weight information with at least one weight curve, wherein weight information which deviates from a weight curve by a predefined value is stored separately or is not considered for the forming of mean values.

7. The poultry weighing scale according to claim 6, wherein at least two gender-specific weight curves are compared and wherein gender-specific weight information which deviates from the weight curve by the predefined value is stored separately or is not considered for the forming of mean values.

8. The poultry weighing scale according to claim 1, wherein the weighing plate is mounted above a weighing cell, wherein the weighing cell is arranged within the poultry weighing scale, and wherein the weighing cell is part of the weighing module.

9. The poultry weighing scale according to claim 1, wherein:
the poultry weighing scale is composed of parts of stainless steel, parts of plastic, or a combination of both; and
the poultry weighing scale is configured with a splash-proof and/or watertight structure.

10. The poultry weighing scale according to claim 1, wherein the poultry weighing scale is configured with a mobile design, and further comprises an undercarriage arranged such that the poultry weighing scale can be tilted on the undercarriage.

11. The poultry weighing scale according to claim 10, wherein the undercarriage comprises rollers, chains, or runners.

12. The poultry weighing scale according to claim 10, wherein the poultry weighing scale further comprises a handlebar, a handle, or a location aid.

13. The poultry weighing scale according to claim 1, further comprising a memory unit, wherein the memory unit is arranged within the poultry weighing scale, and the memory unit is configured to save weight, a gender of poultry, or gender-specific mean values for a plurality of weight information and/or gender information.

14. The poultry weighing scale according to claim 13, wherein at least one weight curve is stored in the memory unit and/or in the weighing module, and wherein the weight curve contains data on a target weight and/or a target weight range in relation to the age of a poultry.

15. The poultry weighing scale according to claim 14, wherein at least two gender-specific weight curves are stored in the memory unit and/or in the weighing module, and wherein all weight curves contain data on a target weight and/or a target weight range in relation to the age of the poultry.

16. The poultry weighing scale according to claim 13, wherein the poultry weighing scale comprises a data interface, and wherein the data interface is configured to transmit data stored in the memory unit.

17. The poultry weighing scale according to claim 1, wherein the poultry weighing scale comprises enticements to enhance the attractiveness of the poultry weighing scale to poultry.

18. A method for the gender-specific weighing of poultry in poultry farming, the method comprising the steps of:
deploying a portable poultry weighing scale in a poultry stall, the portable poultry weighing scale comprising:
a weighing plate which is independently accessible by poultry;
a weighing module, which is configured to detect the weight of one or more birds which are present on the weighing plate; and
a poultry identification unit, which is configured to identify an individual or more birds, and the gender of the birds which are present on the weighing plate;
wherein the weighing module and the poultry identification unit are configured and arranged as a functional unit of the poultry weighing scale and the poultry weighing scale is configured with a mobile design, and further comprises an undercarriage arranged such that the poultry weighing scale can be moved on the undercarriage;
detection of the weight of a bird; and
detection of the gender of a bird which is present on the weighing plate.

19. The method according to claim 18, further comprising the steps of:
saving weight information and/or gender information;
formation and saving gender-specific mean values for a plurality of weight information or gender information;
providing and saving weight information, gender information, or gender-specific mean values with supplementary data comprising time information, geographical information, or environmental information;
transmission of the weight information, gender information, or gender-specific mean values, and of supplementary data; and
comparison of weight information, gender information, or gender-specific mean values with at least one weight curve or at least two gender-specific weight curves.

\* \* \* \* \*